Nov. 15, 1949　　　P. N. EVANS　　　2,488,180
MOBILE HOISTING AND CONVEYING APPARATUS
Filed Dec. 9, 1943　　　　　　　　　　11 Sheets-Sheet 1
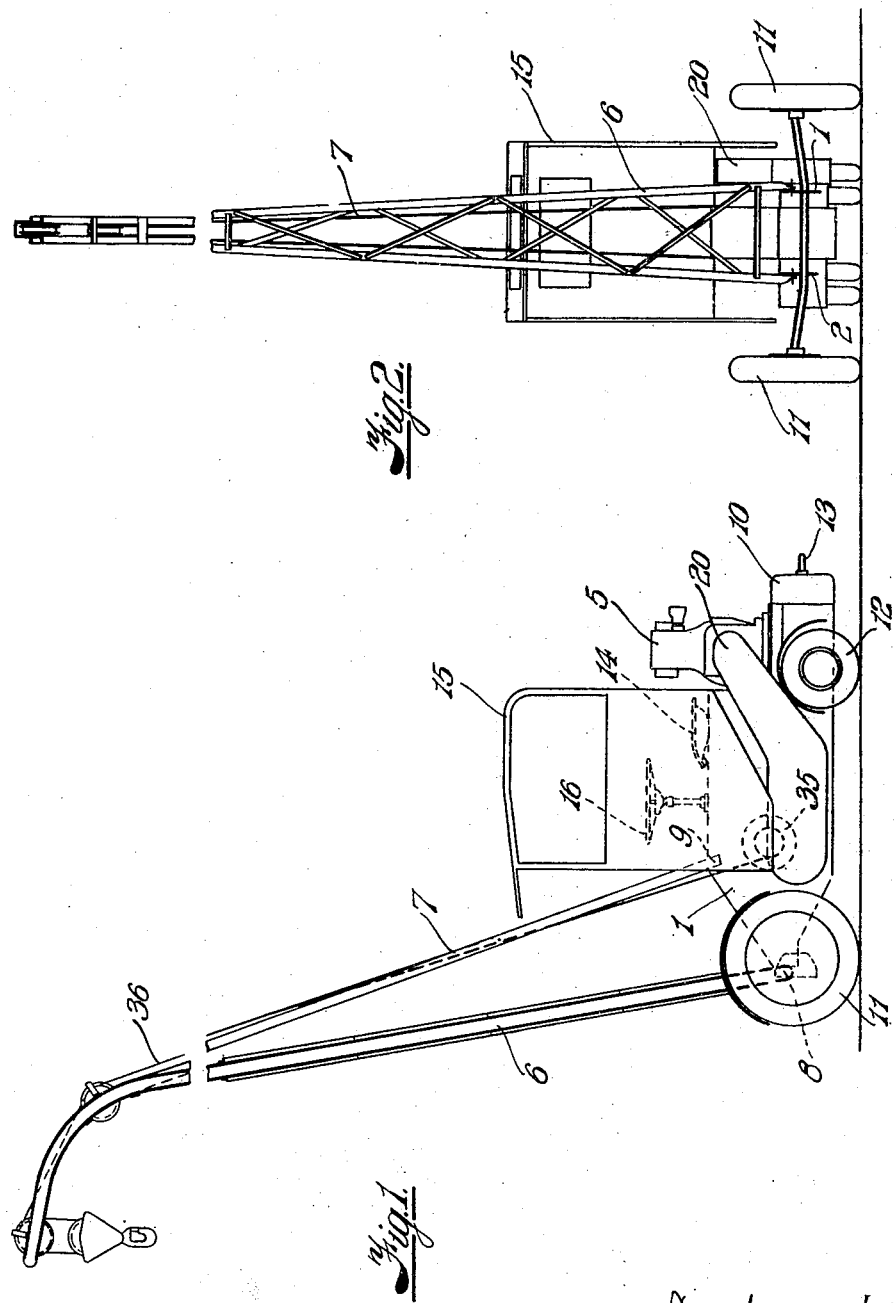

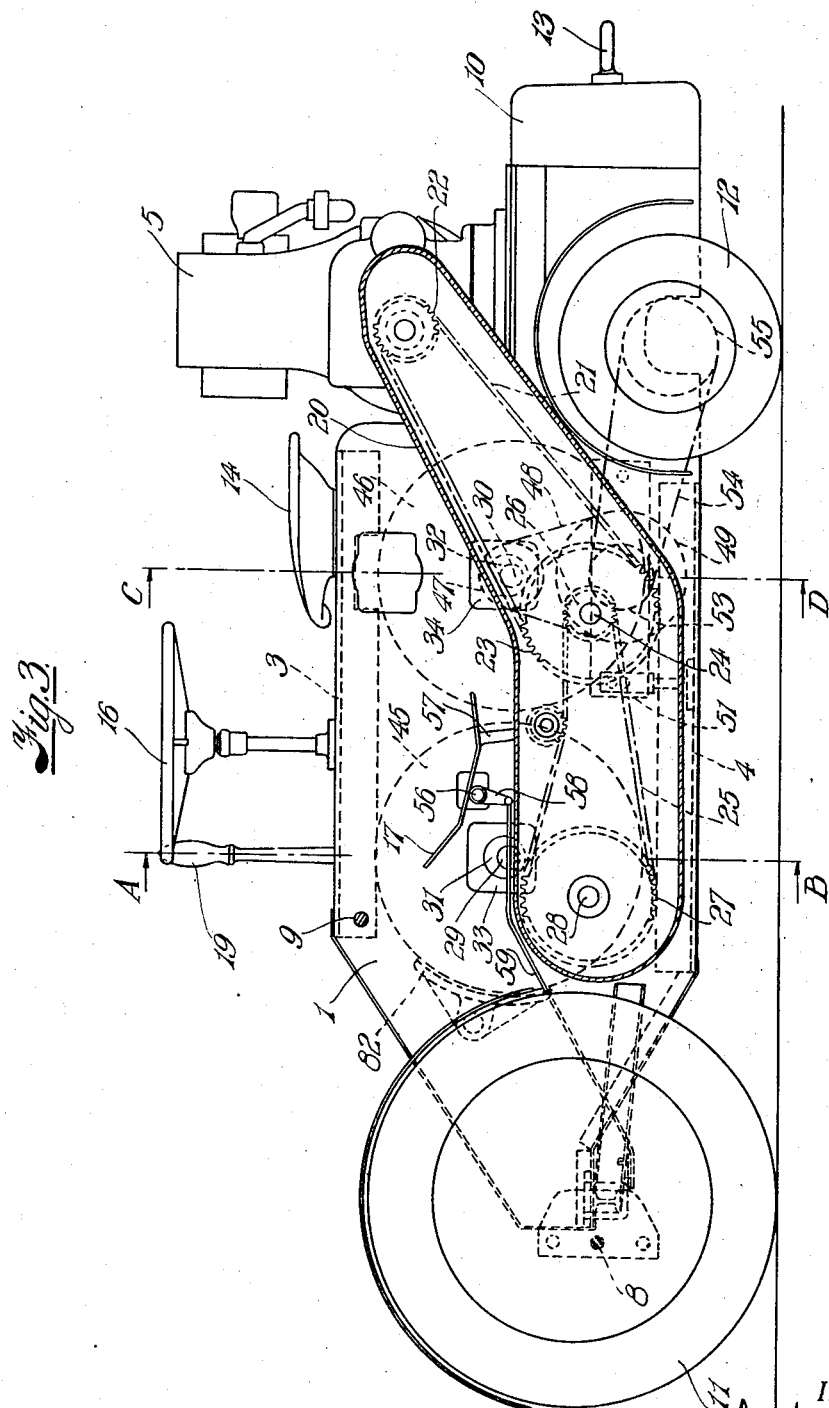

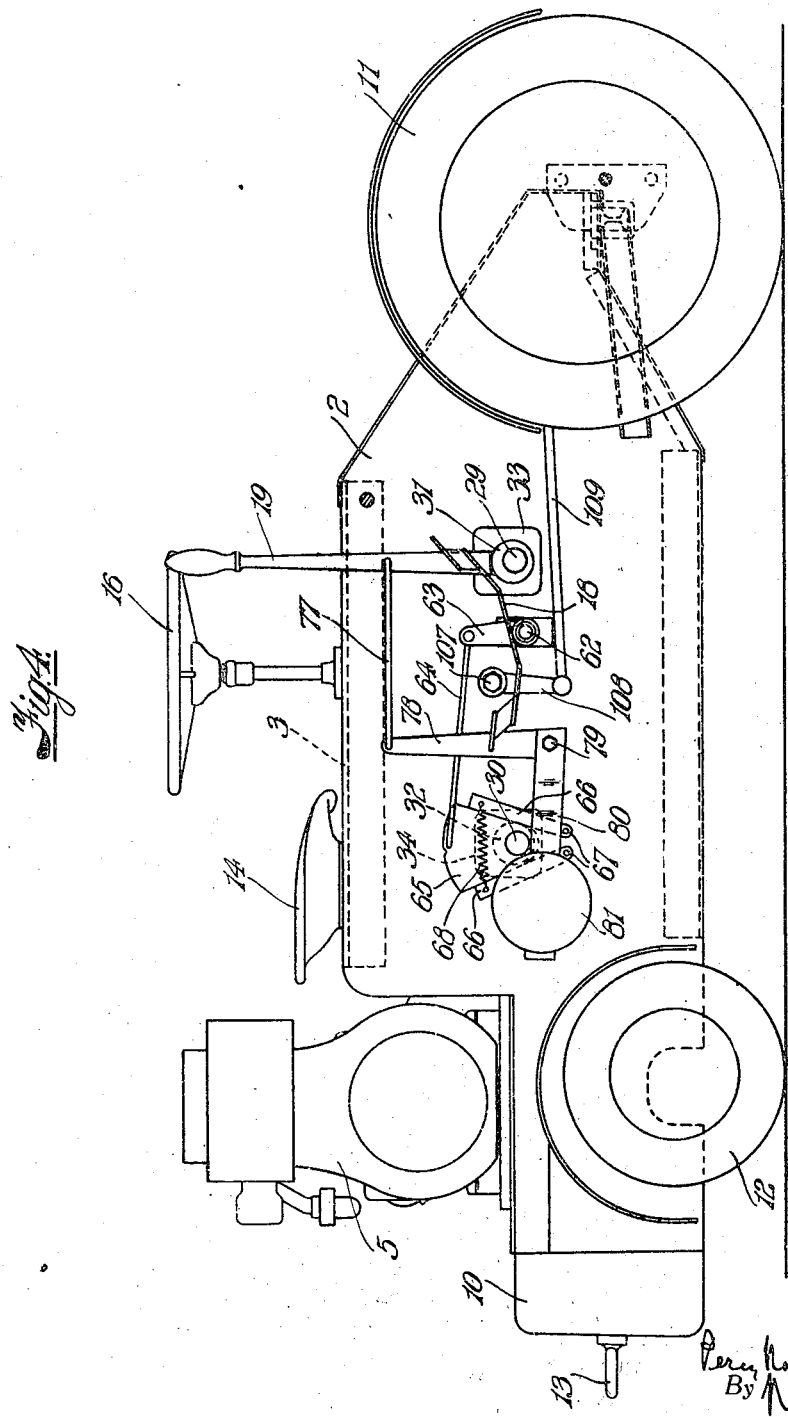

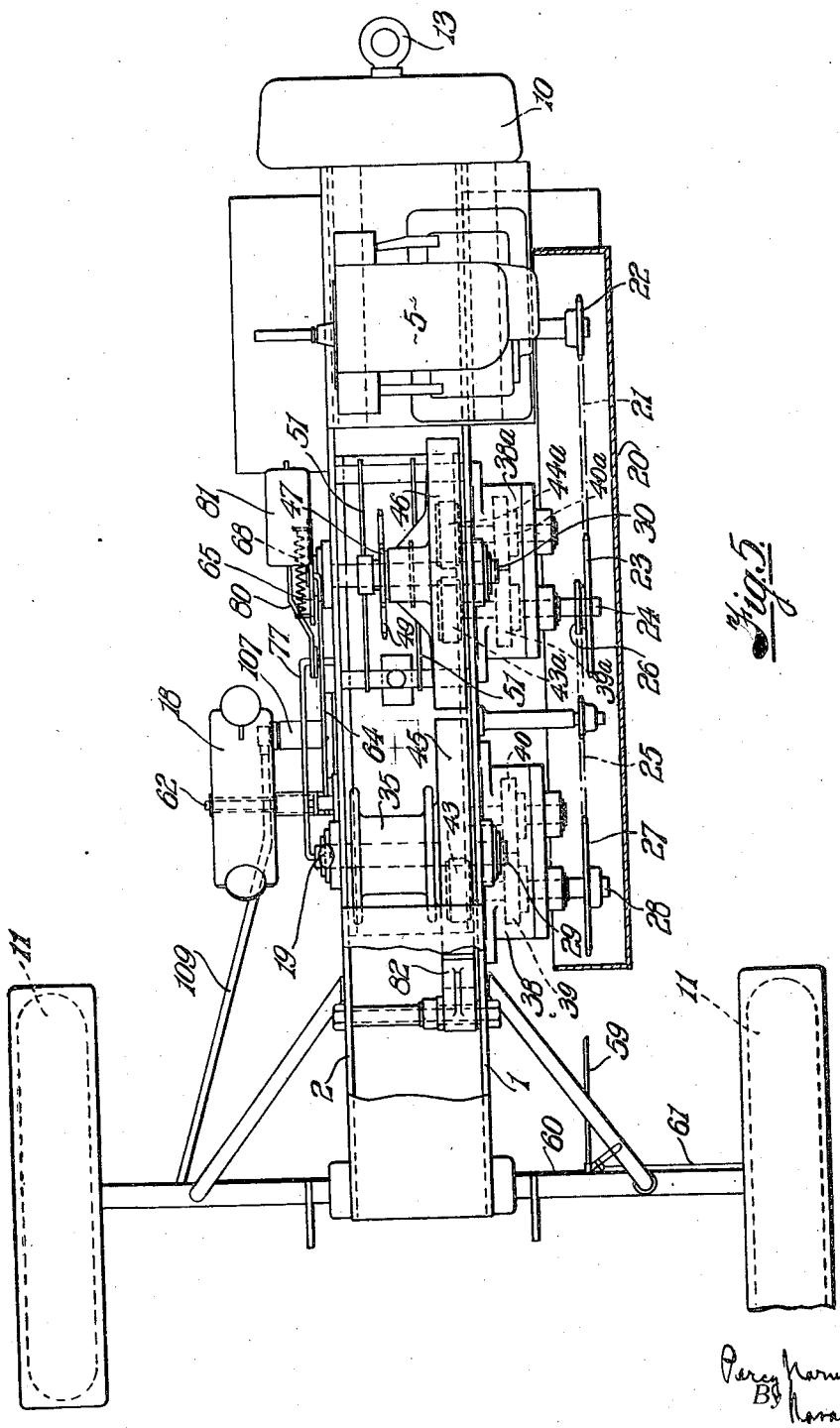

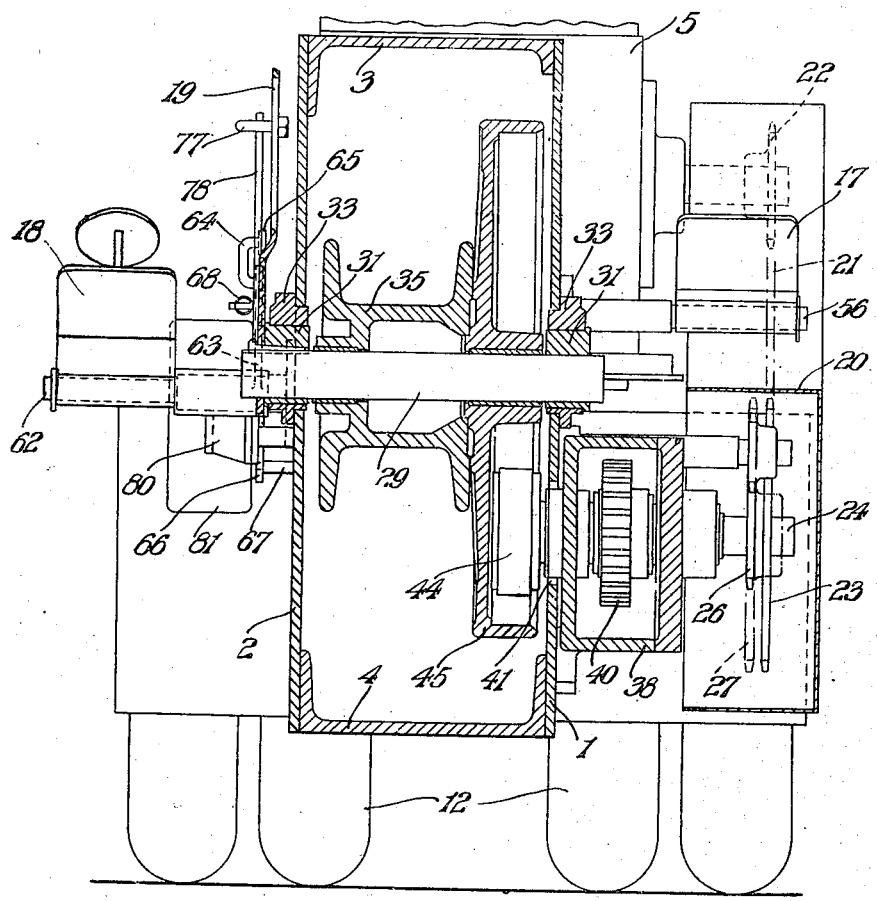

Nov. 15, 1949     P. N. EVANS     2,488,180
MOBILE HOISTING AND CONVEYING APPARATUS
Filed Dec. 9, 1943     11 Sheets-Sheet 6

Inventor
Percy Norman Evans
By
Attorneys

Nov. 15, 1949 P. N. EVANS 2,488,180
MOBILE HOISTING AND CONVEYING APPARATUS
Filed Dec. 9, 1943 11 Sheets-Sheet 7

Inventor
Percy Norman Evans
By
Attorneys

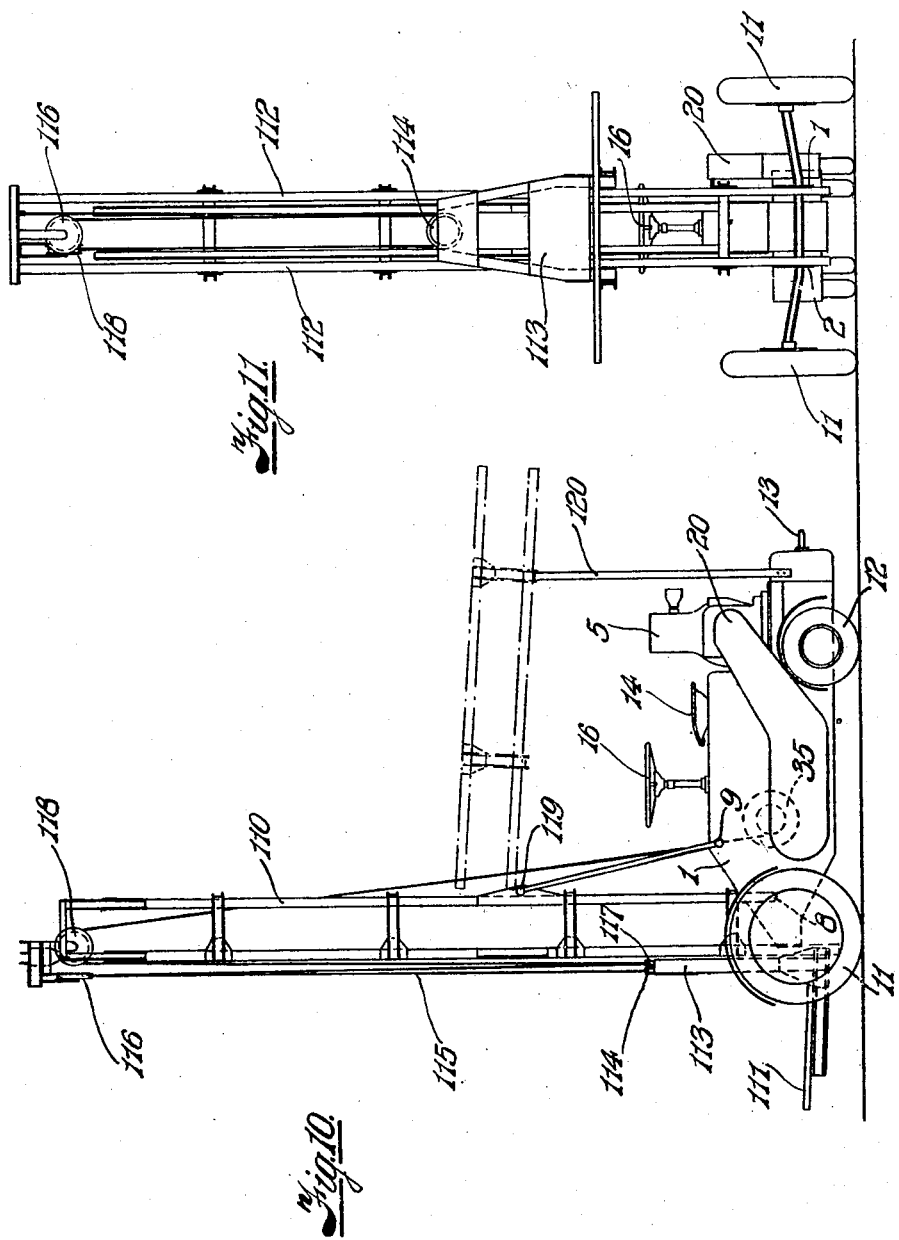

Patented Nov. 15, 1949

2,488,180

UNITED STATES PATENT OFFICE 2,488,180

MOBILE HOISTING AND CONVEYING APPARATUS

Percy Norman Evans, Brentford, England, assignor to A. C. E. Machinery Limited, Brentford, England Application December 9, 1943, Serial No. 513,583
In Great Britain June 2, 1942

12 Claims. (Cl. 254—139.1)

This invention relates to mobile lifting and transporting apparatus and has particular reference to the kind which comprises a power driven truck having a crane or hoist mounted thereon, both truck and crane being driven from a common power unit.

In many industrial establishments the need arises for lifting heavy objects and packages for transfer from one place to another, for loading and unloading vehicles and for transferring goods and materials from one level to another. Such operations frequently necessitate the employment of a number of separate pieces of apparatus and unnecessary time and labour are often consumed by the operations entailed especially where only a fixed hoist is available or a mobile crane of fixed height. The object of the present invention is to overcome these difficulties and provide an improved form of mobile lifting and transporting unit which, with small adjustments, capable of being carried out by unskilled labour, can be readily adapted for any of the variety of purposes above enumerated as well as for others which will become obvious as the description of the invention proceeds.

According to the invention a mobile lifting and conveying apparatus comprises a vehicle chassis, means for attaching to the front of said chassis interchangeable lifting and conveying units, a power unit mounted at the rear of said chassis for propelling the vehicle and for operating the lifting or like unit and devices for starting, stopping and reversing both vehicle and lifting unit all under the control of a single operator.

According to one form of the invention a mobile lifting and conveying apparatus comprises a wheeled chassis, means for detachably mounting a crane jib, stacker or bucket to the front of said chassis, a power unit mounted at the rear of said chassis and adapted to propel the vehicle and operate the hoisting device, and control devices including steering mechanism, a pedal for brake control, a second pedal for controlling forward and reverse movement of the vehicle and hand operated means for controlling the operation of the hoisting gear.

According to the preferred form of the invention a mobile hoisting unit comprises a wheeled chassis, a hoisting device detachably mounted at the front of said chassis, a power unit mounted at the rear of said chassis, frictional driving gears through which the drive from said power unit is transmitted to the rear wheels and to the hoisting device and hand and foot operated devices adapted to shift the positions of components of said gears for the purpose of controlling the movements of the vehicle and of the hoisting device.

Reference will now be made to the accompanying drawings which illustrate mobile lifting and conveying units constructed in accordance with the invention and in which:

Fig. 1 is a side elevation of a mobile crane unit,

Fig. 2 is a front elevation of the unit shown in Fig. 1,

Figure 7:
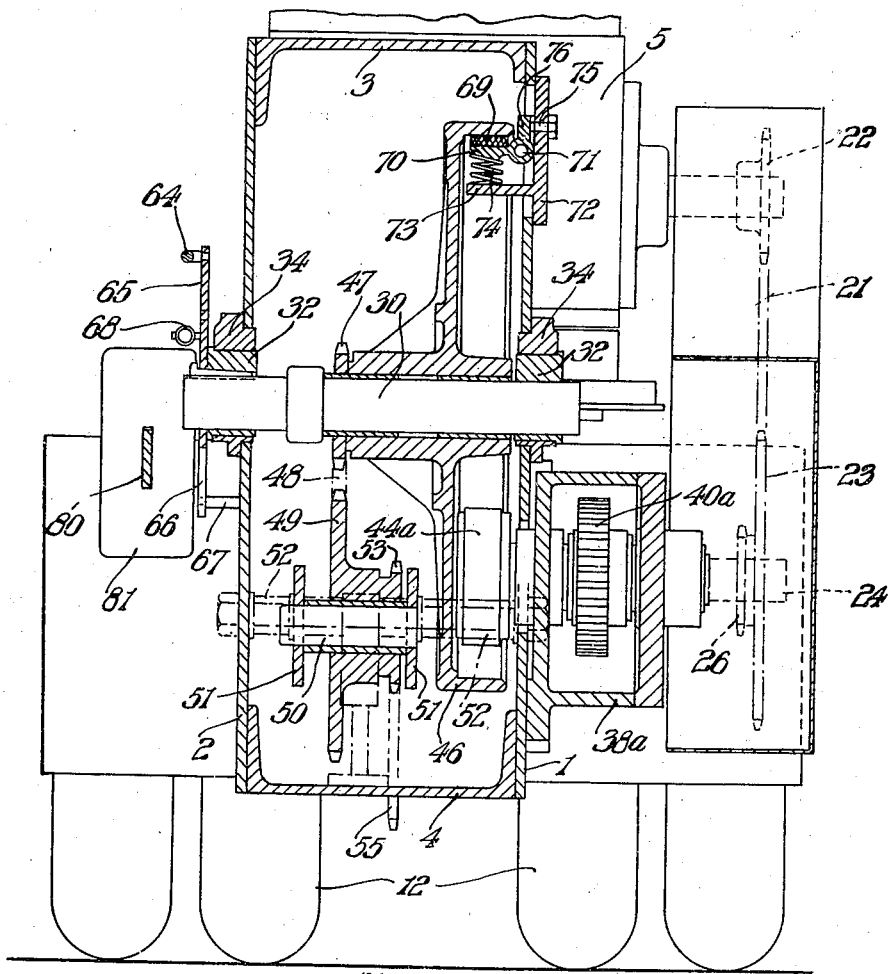
Figure 8:
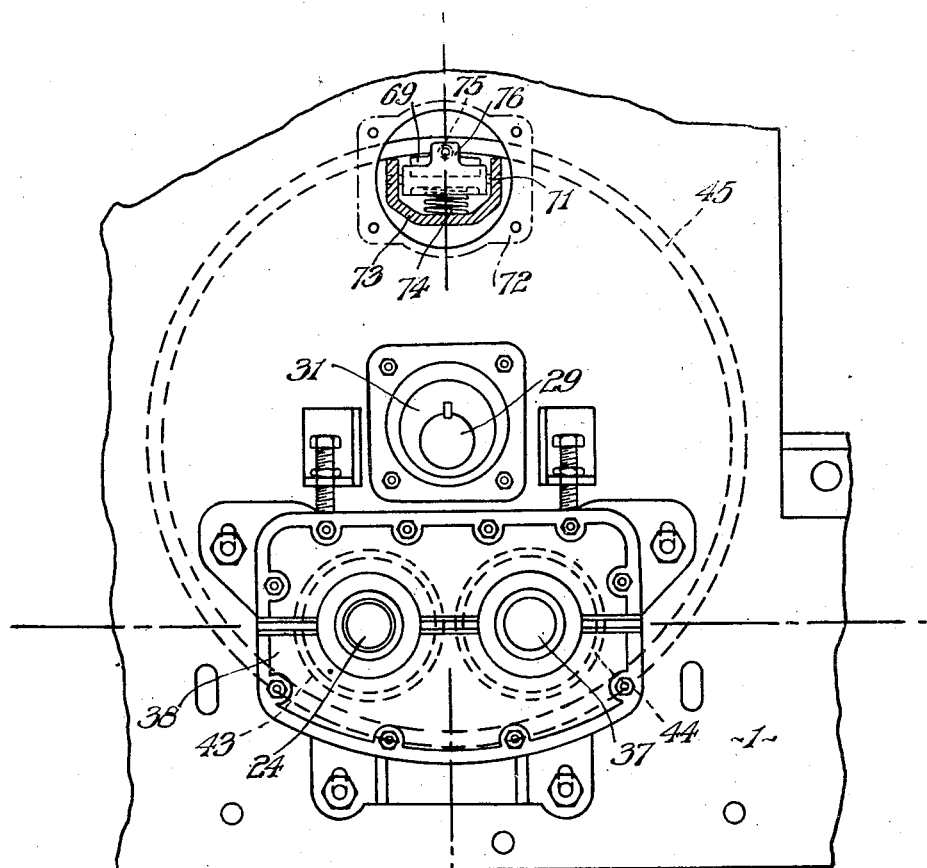
Figure 9:
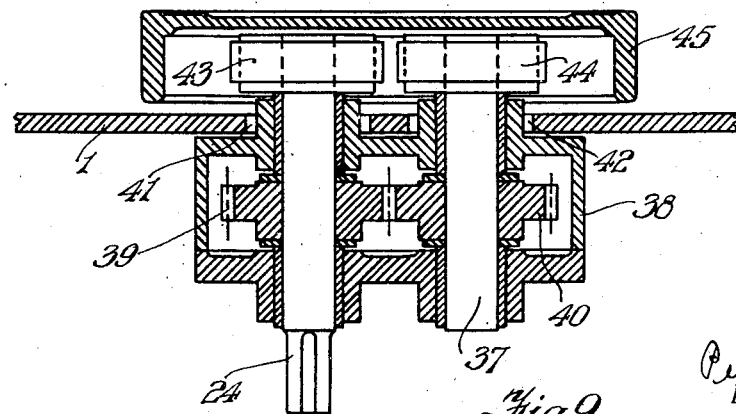
Figure 12:
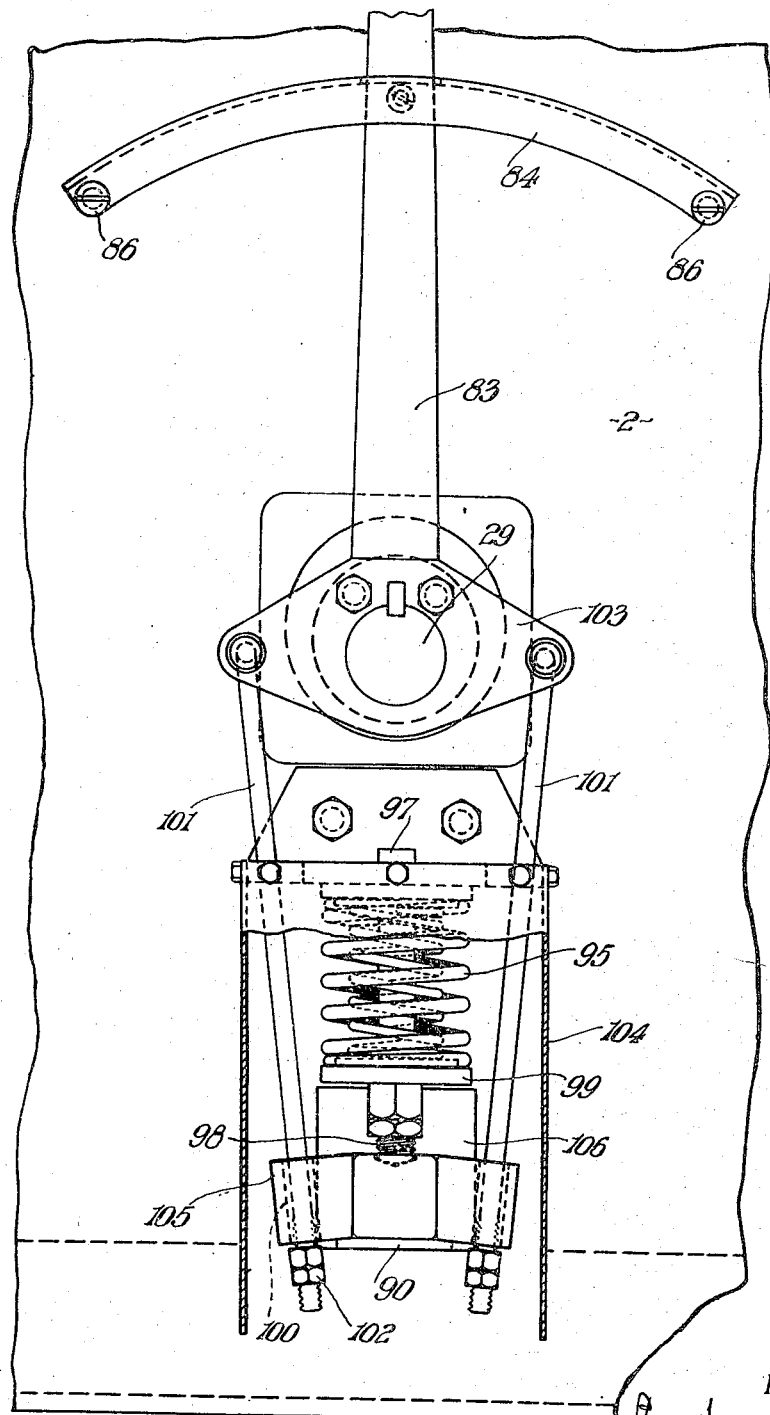
Figure 13:
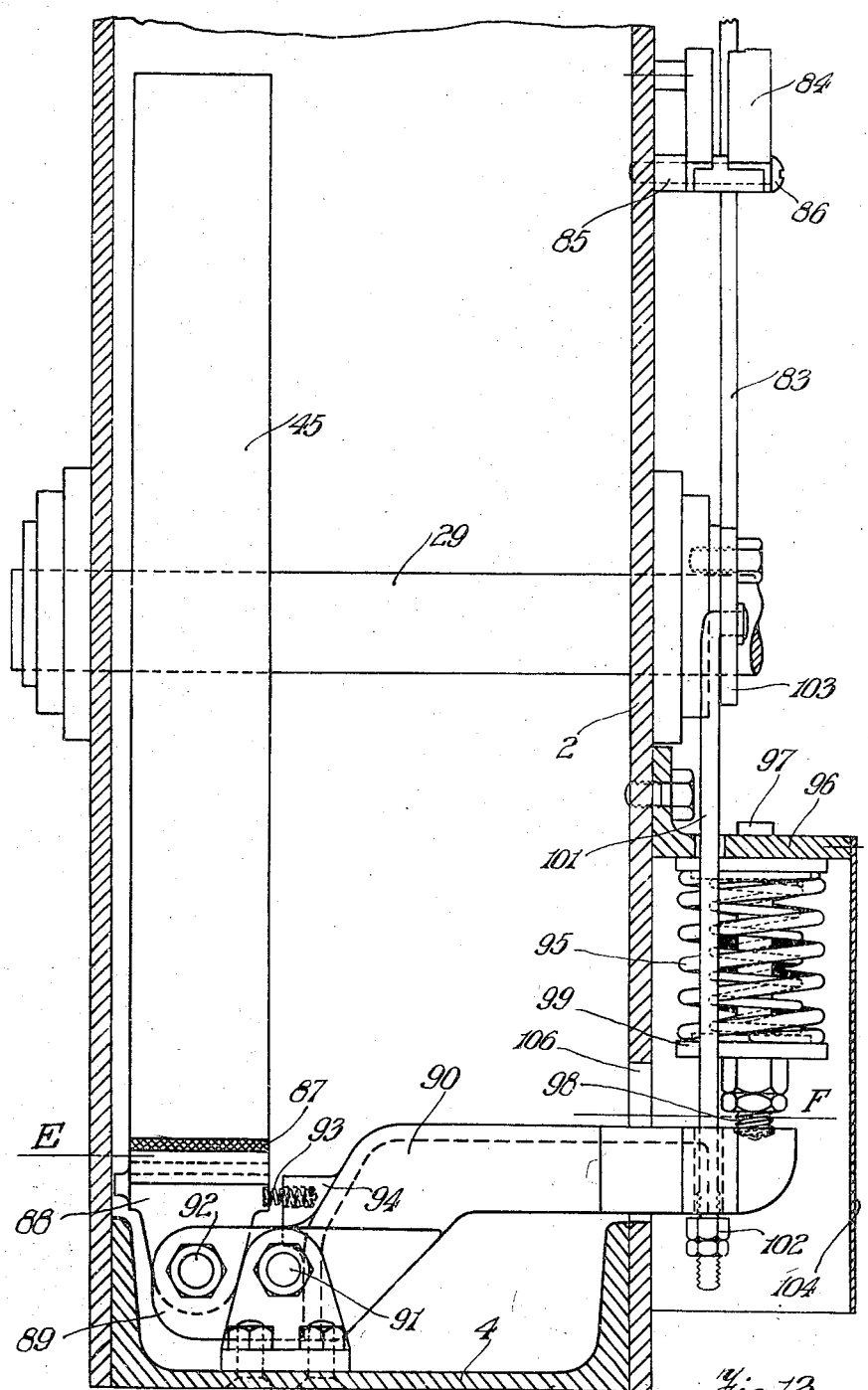
Figure 14:
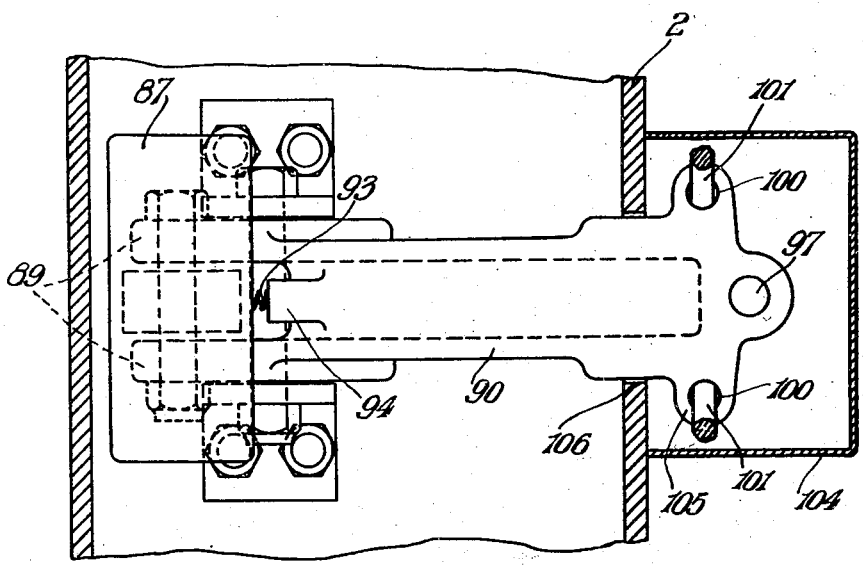

Fig. 3 is a side elevation to an enlarged scale partly in section illustrating the driving mechanism for propulsion and for operating the crane, Fig. 4 is a side elevation also to an enlarged scale showing the side opposite to that shown in Fig. 3, Fig. 5 is a plan corresponding to Figs. 3 and 4 with the top plate broken away to show the operating mechanism, Fig. 6 is a sectional elevation taken on the line A—B of Fig. 3, Fig. 7 is a sectional elevation taken on the line C—D of Fig. 3 showing the driving connections to the rear axle, Fig. 8 is a fragmentary view showing an elevation of the friction drive gear box, Fig. 9 is a sectional plan of one of the frictional driving units, Fig. 10 is an elevation of a mobile unit constructed to act as an elevator or stacker, Fig. 11 is a front elevation of the unit shown in Fig. 10, Fig. 12 is an elevation of an automatic braking device, Fig. 13 is a side elevation of the device shown in Fig. 12, Fig. 14 is a sectional plan taken on the line E—F of Fig. 13, Referring first to Figs. 1 and 2, the mobile lifting and conveying unit comprises a chassis which consists of two parallel vertical plates 1 and 2 connected at top and bottom by horizontal plates 3 and 4 (Figs. 6 and 7) and enclosing between them the driving and control gears hereinafter described and supporting at their rear end a power unit comprising an internal combustion motor 5. To the forepart of the said chassis is connected a crane jib whose components 6 and 7 are detachably bolted at 8 and 9 to the chassis at each side thereof, the crane and its load being counterbalanced by weights 10 secured to the rear of the chassis immediately below the motor 5. The chassis is supported on wheels, the front pair 11 of which are arranged and adapted for steering in the ordinary manner of an automobile vehicle but for the purpose of stability the rear wheels 12 which may consist of a single pair or of two pairs as shown, are of smaller diameter and set closer together than the front pair, as shown in Fig. 2, thereby producing what is in effect a three point support for the chassis which enables it to take considerable unbalanced forces such as will occur in lifting bulky articles or in traversing rough ground, without overturning.

At the rear of the chassis is disposed a coupling device 13 so that the mobile unit can, when required, be used as a tractor. The operator of the units sits astride the chassis on a seat 14 provided near the rear thereof and mounted on the plate 3 and for protection of the operator, when necessary, a light cab 15 is adapted to be detachably fixed to the chassis, as shown in Fig. 1 and is of such dimensions as to enclose all the controls hereinafter described.

The control devices adapted to be actuated by the operator comprise a steering wheel 16 mounted on a column projecting through plate 3 and which is connected to the front wheels 11 in any usual manner, a left foot pedal 17 (Fig. 3) controlling the front wheel brakes, a right foot pedal 18 (Fig. 4) for determining forward or rearward movement of the vehicle and a hand operated control lever 19 for the winding gear of the crane 6—7.

The power drive from the motor 5 is enclosed by a casing 20 fixed to the left side of the chassis as shown in Figs. 1 and 3 and in Fig. 3 the said casing is shown in section so as to expose the driving mechanism which includes a sprocket chain 21 which transmits movement from a sprocket pulley 22 on the shaft of the motor 5 to a sprocket wheel 23 on a countershaft 24, and a sprocket chain 25 which in turn transmits movement from a pinion 26 on shaft 24 to a sprocket wheel 27 on a shaft 28. From the shafts 24 and 28, which are continuously driven, movement is adapted to be transmitted as and when required to the crane haulage gear and to the rear axle of the vehicle as hereinafter described.

Above the shafts 24 and 28 are disposed two cross shafts 29 and 30 fixed in eccentric sleeves 31 and 32 (Figs. 6 and 7) adjustably mounted in bearings 33 and 34 carried in the chassis plates 1 and 2. The shaft 29 carried a drum 35 (Fig. 6) which is fixed to the friction drum 45 and which serves for winding and unwinding the chain or cable 36 of the crane 6—7.

The drive from the continuously rotated shafts 24 and 28 is transmitted to the shafts 29 and 30 when required, through friction gearing which is shown in Fig. 8 and in sectional plan in Fig. 9. The drives to each of the shafts 29 and 30 are of exactly the same character so that a description of one will suffice for both. The input shaft and a parallel shaft 37 are disposed in a gear box 38 adjustably mounted on the outside of the chassis plate 1 and these shafts carry meshing pinions 39 and 40 which cause the two shafts to rotate continuously in opposite directions and at equal speeds. The two shafts project through slots 41 and 42 in the plate 1 and at their inner ends carry friction pinions 43 and 44 which, being of smaller diameter than the pinions 39 and 40, rotate independently in opposite directions at equal speeds. Parts of the friction drives are also shown in Figs. 6 and 7 and to distinguish the drive to the rear shaft 30, those parts of its friction drive which appear in Fig. 7 are distinguished by the letter $a$ added to the reference numeral used in Fig. 9. The shafts 29 and 30 carry friction drums 45 and 46 respectively, the friction pinions 43—44 and 43$a$—44$a$ being disposed within the peripheries of these drums which are adapted to be moved by adjusting the eccentric sleeves 31 or 32 so that according to the rotational direction of such adjustment, the internal surface of drum 45 is adapted to be brought into frictional driven engagement with one of the pinions 43 or 44 or the internal surface of drum 46 is adapted to be similarly brought into engagement with pinion 43$a$ or 44$a$.

When the drum 46 is driven by one of its pinions 43$a$ or 44$a$, the drive received by the drum is transmitted through a sprocket pinion 47, fixed to the drum, and a chain 48 to a sprocket wheel 49 mounted on a short shaft 50 fixed in supports 51 supported by members 52 from the plates 1 and 2 of the chassis. From a pinion 53 fixed coaxially with the wheel 49 the drive is transmitted through a chain 54 to a sprocket wheel 55 (see Fig. 3) mounted on the rear axle.

The controls for the operating mechanism, already briefly indicated, are arranged and operated in the following manner:

The left foot pedal 17 is mounted to rock about the axis of a shaft 56 but is normally held in the position shown in Fig. 3 by a weight 57 fixed to the under surface at the rear of the pedal. The shaft 56 carries a link 58 connected by a rod 59 with front wheel brake operating cables 60 and 61, shown in Fig. 5, and when the pedal is depressed by forward and downward movement of the foot of the driver, the brakes are applied. When the pressure of the driver's foot is released the springs of the brake shoes operate in known manner to release the brake drums and the pedal 17 is restored to the inoperative position shown in Fig. 3 by the action of the weight 57. Rear wheel braking is unnecessary as will appear from the later description.

The right foot pedal 18 is mounted on a rock shaft 62 which carries a link 63 connected by a rod 64 with a sector 65 fixed to one of the eccentric sleeves 32 of the shaft 30 (Fig. 4). Mounted adjacent the sides of the sector 65 are arms 66 movable about fixed pivots 67 and connected at their upper ends by a spring 68. When the forward end of the pedal 18 is rocked downwardly, the movement is transmitted to the eccentric sleeve 32 so that the shaft and the opposite eccentric sleeve 32 are rocked to a slightly different axial position and the drum 46 is brought into driven engagement with the pinion 44$a$. The drive to the rear axle is thus completed and the vehicle moves forward. If the pedal 18 is rocked in the opposite direction, that is, if it is depressed at the rear, the reverse operation takes place, the drum 46 being moved in engagement with the friction pinion 43$a$ and the drive to the rear axle completed so that the vehicle moves in reverse. As the sector moves in either direction it rocks one or other of the arms 66 away from the position shown in Fig. 4 thereby tensioning the spring 68 which operates to return the pedal 18 and drum 46 to inoperative position as soon as the pressure on the pedal is relaxed.

As the shaft 24 is being continuously driven it is necessary to ensure that there is no overrunning when the pressure on pedal 18 is relaxed and for this purpose the drum 46 is provided with a friction braking device whose essential features are indicated in Figs. 7 and 8. This braking device consists of a friction brake pad or block 69 adapted to make contact with the inner surface of the drum and carried by an arm 70 mounted freely on a pivot pin 71 so as to be capable of slight axial movement along the said pin. The pin is carried in a bracket 72 having a projecting portion 73 between which and the arm 70 is disposed a spring 74 for the purpose of urging the brake pad 69 into contact with the drum. This movement is limited by an adjustable stop 75 engaging a projection 76 on the arm 70, the said stop being carried by the bracket 72 which is itself adjustably mounted on the chassis plate 1 to enable the position of the braking device to be adjusted for wear or the brake pad 69 to be renewed. This braking device is set so that when the drive is operative, that is when the drum 46 is moved into engagement with one of the friction pinions, the brake pad 69 is clear of the drum but when pressure on the pedal 18 is relaxed and the drum is moved to a positive to interrupt the drive, it moves into contact with the brake pad 69 whose capability of slight movement in the direction of rotation of the drum causes a wedging action which almost instantaneously brings the drum to rest. By these means the driving connection to the rear axle and wheels can be instantaneously made and broken and by braking the drum 46 as described no separate braking means are needed for the rear wheels.

The operations of the crane are controlled by the hand lever 19 which is fixed directly to one of the eccentric sleeves 31 of the shaft 29 as shown in Fig. 4. Movement of the lever 19 to an inclined position either in the forward or rearward direction shifts the axis of rotation of the drum so that it is engaged and driven by one of the friction pinions 43 or 44 to rotate the winding drum 35 to haul in or pay out the crane cable 36 to lift or lower a load. As both operations are effected under power, there is no tendency of a load to get out of control while being lowered. The lever 19 is connected by a link 77 with one arm 78 of a bell crank lever pivoted at 79 to the plate 2 and whose other arm 80 carries a counterbalance weight 81 at its rear and arranged to return the lever 19 to braking position when released by the hand of the operator. Adjacent the drum 45 is mounted a friction brake shoe 82 which holds the drum 45 and winding drum 35 immovable whenever the lever 19 is released by the operator.

In the arrangement shown in Figs. 3, 4 and 6 only one friction pinion 43 is necessary to operate the winding drum 35. The control lever 19 is capable of occupying three positions, that shown in Fig. 4 being the release position wherein the drum 45 is out of contact with its driving friction pinion 43 and with the brake shoe 82 so that a load suspended from the crane jib can be lowered by gravity. When the lever 19 is moved forward (that is in a clockwise direction, Fig. 4) the drum 45 is moved into engagement with its driving friction pinion and the load is raised. When the lever 19 is moved rearward (that is in an anti-clockwise direction, Fig. 4) the drum 45 is moved into contact with the brake shoe 82 and further movement of the drum is prevented. This position is automatically assumed whenever the lever 19 is released by the driver, owing to the action of the weight 81.

The winding drum may be adapted for power lowering as well as power hoisting by employing two friction pinions 43 and 44 within the drum 45 but in that case it is preferred to control the movements of the drum 45 and of the haulage drum 35 by means of the arrangement now to be described with reference to Figs. 12–14.

This arrangement comprises a hand control lever 83 fixed to one end of the shaft 29 whose inoperative position is the vertical one shown in Fig. 12, but which is movable to either side of the vertical position within limits imposed by guides 84 consisting of two parallel flanged plates, as shown in Fig. 13, connected at their outer ends by members 85 through which pass screws 86 by which the plates are mounted on the frame plate 2.

By the movement of the lever 83 in either direction, the brake drum is shifted owing to its eccentric mounting and brought into operative engagement with one of the friction pinions in the manner already described.

The brake drum 45 is normally prevented from rotating by means of a brake pad or shoe 87 which engages its periphery and is carried in an arm 88 mounted in the end 89 of an arm 90 which can rock about a fixed pivot 91 supported upon the base plate 4. The brake shoe 87 conveniently engages the drum in a position vertically beneath the shaft 29 and is brought into or out of operative position by the arm 89—90 rocking about the horizontal axis of the pivot 91. The arm 88 is capable of movement relatively to the arm 89 being pivoted thereto at 92 and it is engaged by a spring 93 mounted in a recess formed in a shoulder 94 on the arm 90, which spring assists the arm 88 and the shoe to adjust itself so as to fit accurately around the periphery of the drum 45. The brake shoe 87 and arm 89—90 are shown in the sectional plan, Fig. 14, which shows the lower part of the apparatus with the brake drum and its shaft removed.

The portion 90 of the brake shoe arm is of greater length than the portion 89 and is maintained normally in the brake applying position by means of a spring 95 which is under constant tension, its upper end bearing against the under surface of a plate 96 forming part of a bracket which is fixed to the plate 2. The plate 96 is perforated to form a guide for a rod 97 whose lower end 98 bears in a recess in the upper surface of the arm 90 and the rod also carries a disc 99 against which bears the lower end of the spring 95. At each side of the spring 95, the arm 90 is formed with a slot 100 and through these slots pass rods 101 whose lower ends carry nuts 102 bearing upon the under surface of the arm 90 and whose upper ends are connected to the ends of a bracket 103 formed integral with or fixed to the hand control lever 83. The spring 95 and its associated parts are enclosed by a casing 104 which is shown broken away in Fig. 12 for the sake of clearness. The slots 100 are formed in laterally projecting portions 105 of the arm 90 which are outwardly and downwardly inclined as shown in Fig. 12 so as to afford seatings for the nuts 102 at the lower end of the inclined rods 101. The arm 90 projects through a slot 106 in the plate 2 which is of sufficient dimensions to permit the arm to rock from the position shown in Fig. 13 to one in which the brake shoe 87 is removed from contact with the drum 45.

As long as the hand lever 83 is in the vertical position shown in Fig. 12 the spring 95 maintains the arm 89—90, in the position shown in Fig. 13 and holds the brake shoe 87 in operative contact with the periphery of the drum 45. When the hand lever 83 is moved to right or left of its neutral position, however, the brake drum is brought into engagement with one of its driving pinions. This movement also rocks the bracket 103 so that a simultaneous pull is exerted on one of the rods 101 which through the nut at its lower end transmits the pull to the arm 89—90 which is thereby rocked in an anti-clockwise direction (Fig. 13) compressing the spring 95 and reaching a position wherein the brake shoe 87 is removed from contact with the drum which is thereafter power driven until the hand lever is again moved to its neutral position when the drive is instantaneously interrupted by the brake shoe 87 engaging the periphery of the drum. The return movement of the brake shoe to operative position is caused automatically by the expansion of the spring 95 which rocks the arm 89—90 back to the position shown in Fig. 13. The members forming the guides 84 may be formed with a gate construction to enable the hand lever 83 to be retained for any length of time in a position in which the drum 45 is free to rotate.

As shown in Fig. 12 there is normally a slight clearance between the nuts 102 and the lever 90, this clearance being provided to ensure that when the spring 95 operates, movement of the brake shoe must necessarily take place and there is no danger of the brake shoe being held off the drum.

The movements of the steering wheel 16 are communicated to a horizontal shaft 107 (Figs. 4 and 5) which carries an arm 108 connected by a rod 109 to the stub axles of the front wheels 11 in any usual manner.

The controls above described operated by the pedals 17 and 18, the hand lever 19 and the steering wheel 16 enable the unit as a whole to be very easily and quickly manoeuvred in a comparatively small area. It is not necessary, therefore, to provide any traversing gear for the crane jib 6—7 as when a load has been lifted the vehicle as a whole can be turned readily to enable the load to be deposited in the exact position required. Further owing to the braking devices provided and particularly to the automatic braking of the winding mechanism, the driver has always full control over the load especially when lowering as well as lifting is effected under power. As a further advantage, the simplicity of the controls enables the operator to adjust the position of a crane hook or hoist platform with one hand while steering the vehicle with the other hand so that it can arrive at a given point completely ready to take up or deliver a load.

The usefulness of the unit can be further extended by means of the modification illustrated in Figs. 10 and 11 wherein the vehicle and its driving and controlling means are arranged precisely as in the construction described with reference to Figs. 1 to 9.

In Figs. 10 and 11 the crane jib 6—7 is replaced by a platform hoist or stacker comprising a framework, the four upright members 110 of which are adapted to be bolted to the chassis 1—2 at 8 and 9 in the same manner as the crane jib. Movably mounted on the front of the frame members 110 is a horizontal platform 111 whose rear edge carries means to engage vertical guides 112. The platform 111 is fixed to the base of a movable frame 113 the upper portion of which houses a pulley 114. A cable 115 is fixed at one end to the top of the framework 110, passes around the pulley 114, thence around a pulley 116 at the top of framework 110, then around a pulley 117 also mounted in the frame 113 and finally over a second pulley 118 at the top of framework 110 from which the cable passes to the winding drum 35. In Fig. 10 the platform is shown at the bottom of its travel and in Fig. 11 the platform is shown partly raised. The framework 110 is preferably constructed as shown so that when not in use its upper portion can be folded back around a hinge 119 into a horizontal position, as indicated in broken lines in Fig. 10, in which position the said upper framework portion is supported by a light frame 120 extending upwards from the rear of the chassis, this arrangement being adapted for convenience in moving the unit through arches and doorways.

It is intended that the invention shall provide a multi-purpose mobile unit as by supplying the chassis with several crane jibs of different lengths, a platform hoist, and a cab, the user is enabled to carry out a variety of functions with one machine whereas formely entirely separate pieces of apparatus were necessary.

I claim:

1. A mobile unit comprising a vehicle chassis, a cable winding drum mounted on the chassis, a power unit mounted at the rear of the chassis, a gear box carried by said chassis and containing elements driven continuously by said power unit, means for transmitting the drive from said gear box to said winding drum, means including a handle connected to said means for transmitting the drive to the winding drum and capable of occupying a position wherein said winding drum is positively driven for lifting purposes, a second position wherein said drum is driven for lowering purposes, and a third or neutral position, means for automatically returning said handle to said third position whenever released from the hand of the operator, and means for braking said drum against movement while said handle is in said third position.

2. A mobile unit according to claim 1, wherein said means for transmitting the drive to the winding drum includes a friction drum, and said elements in said gear box comprise oppositely driven friction pinions for driving the winding drum in cable winding and unwinding directions respectively, and including means controlled by said handle for moving said friction drum into and out of engagement with said friction driving pinions.

3. A mobile unit comprising a vehicle chassis, a brake for controlling its travel, a cable operated lifting device attached to the front of the chassis, a cable winding drum for said device, a power unit mounted on the chassis, two friction devices carried by said chassis and each comprising a friction drum and friction driving pinions driven continuously by said power unit, means connecting one of said friction drums to the vehicle wheels to drive them, means for connecting the other of said friction drums to said cable winding drum, a pedal mounted at one side of the chassis, means operative by said pedal for moving said friction drum connected to the vehicle wheels into and out of engagement with respect to its friction driving pinions, a second pedal mounted at the other side of the chassis for controlling said brake, hand operated means, and means operative by said hand operated means for moving said friction drum connected to the cable winding drum into and out of engagement with respect to its friction driving pinions.

4. A mobile unit comprising a vehicle chassis, a cable operated lifting device mounted thereon, a cable winding drum for said device, a power unit mounted on the chassis, two friction devices carried by said chassis and each comprising a friction drum and friction driving pinions driven continuously by said power unit, means connecting one of said friction drums to the vehicle wheels to drive them, means for connecting the other of said friction drums to said cable winding drum, a pedal having means controlled thereby for moving said friction drum connected to the vehicle wheels into and out of engagement with respect to its friction driving pinions, hand operated means for moving said friction drum connected to the cable winding drum into and out of engagement with respect to its friction driving pinions, said pedal and hand operated means each being movable to a neutral position, and friction braking devices engageable with the respective friction drums automatically whenever said pedal or hand operated means is moved to neutral position.

5. A mobile unit according to claim 4, wherein said friction braking device for the friction drum connected to the vehicle wheels has means for preloading it, and said hand operated means comprises a single control lever operative to control the engagement and disengagement of said friction drum with respect to its friction driving pinions and to control the operative contact between said friction drum and said braking device.

6. A mobile unit according to claim 4, wherein said friction driving pinions for said friction drum connected to the vehicle wheels are arranged in a pair, and have means for driving them in opposite directions, and said pedal is movable into either of two positions to engage said friction drum with one or the other of said pinions, and wherein said friction braking device for said friction drum is engaged with said friction drum while said pedal is in a neutral position between said two positions and is released when said pedal is moved into either of said two positions.

7. A mobile unit according to claim 4, wherein said friction drum connected to the vehicle wheels is mounted on an eccentric bearing which is rotatable by said pedal to shift the axis of said friction drum transversely, and said friction driving pinions are arranged in a pair having means for driving them in opposite directions and are engageable by said friction drum when its axis is shifted in one or another direction.

8. A mobile unit according to claim 4, wherein said hand operated means comprises a lever, and said friction drum connected to the cable winding drum is mounted on an eccentric bearing which is rotatable by said lever to shift the axis of said friction drum transversely and said friction driving pinions are arranged in a pair having means for driving them in opposite directions and are engageable by said friction drum when its axis is shifted in one or another direction, and wherein said friction braking device for the friction drum connected to the cable winding drum is connected to said lever to be applied to said friction drum when the latter is shifted into disengaged relation with said driving pinions, and including spring actuated means for maintaining said lever in brake applying position.

9. A mobile lifting and conveying apparatus comprising a wheeled chassis having brakes, means for detachably mounting a cable operated lifting device to the front of said chassis, a cable winding drum for said lifting device, a power unit mounted at the rear of said chassis and means connected to said power unit to propel the wheeled chassis and operate the cable winding drum, and control devices including steering mechanism, a pedal at one side of the chassis for controlling said brakes, a second pedal at the opposite side of the chassis connected to said means for controlling forward and reverse movement of the wheeled chassis, and hand operated means connected to said means for controlling the operation of the cable winding drum.

10. A mobile hoisting unit comprising a wheeled chassis, a cable operated lifting device detachably mounted at the front of said chassis, a cable winding drum for said lifting device, a power unit mounted at the rear of said chassis, frictional driving gears each having relatively shiftable components through which the drive from the said power unit is transmitted reversibly to the rear wheels and said drive is transmitted to the cable winding drum, and hand and foot operated devices for shifting the positions of components of the respective frictional driving gear for the purpose of controlling the forward and reverse movements of the wheeled chassis and the operation of the cable winding drum.

11. A mobile unit according to claim 9, wherein the means connected to said power unit operates continuously driven elements in a pair of gear boxes mounted in the said chassis, one of said gear boxes being adapted to transmit the drive to the rear wheels and the other of said gear boxes being adapted to transmit the drive to said cable winding drum.

12. A mobile lifting and conveying apparatus comprising a chassis having front and rear wheels, steering mechanism and brakes, a cable operated lifting device adapted to be detachably mounted at the front of said chassis, a cable winding drum for the lifting device, a power unit supported at the rear of said chassis, means for transmitting the drive from said power unit to the rear wheels and to the cable winding drum for the lifting device, friction driving elements forming part of said transmitting means and adapted to be relatively moved to complete or interrupt the drive to the rear wheels and to the said winding drum, a pedal at one side of the chassis connected to said transmitting means for controlling the forward and reverse movements of the vehicle, a second pedal at the opposite side of the chassis connected to said transmitting means for controlling the operation of front wheel brakes, a hand lever for controlling the operation of the said winding drum.

PERCY NORMAN EVANS.

REFERENCES CITED

The following references are of record in the file of this patent:

UNITED STATES PATENTS

| Number | Name | Date |
|---|---|---|
| 986,181 | Kraft et al. | Mar. 7, 1911 |

(Other references on following page)

UNITED STATES PATENTS

| Number | Name | Date |
|---|---|---|
| 1,315,970 | King | Sept. 16, 1919 |
| 1,426,116 | Simons | Aug. 15, 1922 |
| 1,506,906 | Holcomb et al. | Sept. 2, 1924 |
| 1,674,926 | Skelton et al. | June 26, 1928 |
| 1,713,780 | Remde | May 21, 1929 |
| 1,901,566 | Presbrey | Mar 4, 1933 |
| 1,912,816 | Anthony | June 6, 1933 |
| 2,038,581 | Lent | Apr. 28, 1936 |
| 2,051,289 | Custer | Aug. 18, 1936 |
| 2,171,792 | Hutchins | Sept. 5, 1939 |
| 2,251,013 | Donley et al. | July 29, 1941 |
| 2,284,237 | Stevenson | May 26, 1942 |
| 2,301,832 | Towson et al. | Nov. 10, 1942 |
| 2,325,568 | Eaton | July 27, 1943 |
| 2,332,561 | Drott | Oct. 26, 1943 |
| 2,336,965 | Shoemaker | Dec. 14, 1943 |
| 2,337,109 | Johnson | Dec. 21, 1943 |
| 2,340,543 | Magee | Feb. 1, 1944 |

FOREIGN PATENTS

| Number | Country | Date |
|---|---|---|
| 181,789 | Great Britain | June 15, 1922 |
| 561,233 | Great Britain | May 11, 1944 |